(12) United States Patent
Morikoshi et al.

(10) Patent No.: US 6,659,898 B2
(45) Date of Patent: Dec. 9, 2003

(54) MOLDED PART

(75) Inventors: Makoto Morikoshi, Mie (JP); Kouichi Sakogawa, Mie (JP); Toshihiro Otsu, Mie (JP)

(73) Assignees: Yukadenshi Co., Ltd., Tokyo (JP); Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 09/749,787

(22) Filed: Dec. 28, 2000

(65) Prior Publication Data
US 2001/0016531 A1 Aug. 23, 2001

(30) Foreign Application Priority Data

| Dec. 28, 1999 | (JP) | ............................................ 11-372335 |
| Dec. 28, 1999 | (JP) | ............................................ 11-372336 |
| Dec. 28, 1999 | (JP) | ............................................ 11-372338 |
| Feb. 14, 2000 | (JP) | ..................................... P. 2000-035535 |
| Feb. 14, 2000 | (JP) | ..................................... P. 2000-035536 |

(51) Int. Cl.$^7$ .............................. F16G 1/06; C08K 3/40; B29D 29/00

(52) U.S. Cl. ...................... 474/237; 474/264; 524/495; 156/137; 156/139

(58) Field of Search ................................ 474/260, 237, 474/263, 264, 268; 399/302, 308; 428/36.91, 36.2, 36.1, 36.92; 264/105, 150; 524/580, 495; 525/420, 422; 156/137, 139

(56) References Cited

U.S. PATENT DOCUMENTS

| 4,874,647 A |   | 10/1989 | Yatsu et al. |
| 5,225,259 A | * | 7/1993 | Akao ........................ 524/580 |
| 5,258,154 A |   | 11/1993 | Okuyama et al. |
| 5,321,096 A | * | 6/1994 | Okawa et al. .............. 525/420 |
| 5,899,610 A | * | 5/1999 | Enomoto et al. ........... 399/302 |
| 5,990,225 A |   | 11/1999 | Sagisaka et al. |
| 6,217,964 B1 | * | 4/2001 | Ndebi et al. .............. 428/36.91 |

FOREIGN PATENT DOCUMENTS

| EP | 0 273 152 |   | 7/1988 |
| EP | 0 495 668 |   | 7/1992 |
| EP | 0 634 435 |   | 1/1995 |
| EP | 0 736 558 |   | 10/1996 |
| EP | 0 774 491 |   | 5/1997 |
| EP | 0 942 336 |   | 9/1999 |
| JP | 3-89357 |   | 4/1991 |
| JP | 4-159560 |   | 6/1992 |
| JP | 04-194865 | * | 7/1992 |
| JP | 6-149081 |   | 5/1994 |
| JP | 6-149083 |   | 5/1994 |

* cited by examiner

*Primary Examiner*—Marcus Charles
(74) *Attorney, Agent, or Firm*—Oblon, Spivak, McClelland, Maier & Neustadt, P.C.

(57) ABSTRACT

An endless belt, comprising a molding in the shape of an endless belt obtained by mixing a crystalline resin having at least one hydroxyl group, carboxyl group or an ester linkage, an amorphous resin having at least one hydroxyl group, carboxyl group or an ester linkage, and a polymerization catalyst while heating, thereby preparing a resin composition; and molding said resin composition.

21 Claims, 2 Drawing Sheets

MOLDED PART

FIELD OF THE INVENTION

This invention relates to a molded part excellent in mechanical and electrical characteristics which is particularly suitable as an endless belt.

BACKGROUND OF THE INVENTION

Endless belts are widely used in image forming apparatus (e.g., OA equipment) as a photoreceptor belt, an intermediate transfer belt, a carrier transfer belt, a transfer separation belt, a charged tube, a developing sleeve, a fixing belt, a toner transfer belt, and the like.

For example, an intermediate transfer system comprises an intermediate transfer member, on which a toner image is formed and transferred onto a recording medium, such as paper. An endless belt is used as the intermediate transfer member for electrifying and destaticizing a toner on its surface. The electrical resistance of the endless belt to be used is set according to the model of the system. A carrier transfer system comprises a carrier transfer member, on which paper is held. After a toner is transferred from a photoreceptor onto the paper held on the carrier transfer member, the paper is separated from the carrier transfer member by destaticization. An endless belt is used therein as a surface of the carrier transfer member for electrifying and destaticizing paper. The electrical resistance of the endless belt for the carrier transfer system is also set for individual models.

An electrically conductive endless belt used in electrophotographic copying machines, etc. is driven for a long period of time under high tension by two or more rolls and is therefore required to have sufficient durability. Where used in the intermediate transfer system, etc., since a toner image is once formed on the belt and then transferred to paper, a sag or stretch of the belt in operation results in image distortion. Further, the belt used in the intermediate transfer system is required to have electrical conductivity to some extent to carry out electrostatic toner transfer.

With the increasing printing speed of latest printing machines, the belt driving speed has been increasing, which demands further improvement in durability of the belt. The belt durability and prevention of image distortion are particularly demanded for the belts to be used in tandem type carrier transfer or intermediate transfer systems having four photoreceptors and toner jetting systems which are attracting attention for their high-speed printing ability.

Various molding materials which have been employed to produce the above-described endless belts have their several disadvantages as follows.

Endless belts made of rubber are too stretchy due to their low elastic modulus and have poor toner releasability. Laminating rubber with other materials has been attempted, which makes the production process complicated and increases the cost.

Endless belts made of polycarbonate (hereinafter abbreviated as PC) have poor flex resistance and are liable to develop cracks while driven on rollers.

Endless belts made of polyimide are, while excellent in flex resistance, not only difficult to produce by continuous molding because polyimide is a thermosetting resin but expensive. Further, their elastic modulus are as high as about 6000 MPa, which imposes a load to the belt driving motor. The load cannot be reduced but by reducing the belt thickness, but such will lead to poor reliability because the belt with a reduced thickness would easily develop cracks if dust enters between a roller and the belt, or if the belt is scratched by friction with the photoreceptor.

Endless belts made of a polyalkylene terephthalate (hereinafter abbreviated as PAT) are better than PC belts in flex resistance but leave much room for improvement.

Endless belts made of a fluororesin is, while excellent in flex resistance, stretchy under tension due to their low Young's modulus of about 1000 to 1400 MPa. As a result, color print may suffer from a shear, or the toner may be transferred as distorted to paper.

Endless belts made of a polyblend of PC and a PAT, such as polybutylene terephthalate, are also proposed (see JP-A-4-313757 and JP-A-6-149083). They have improved flex resistance over PC belts but are still insufficient. Besides, a PAT resin, being highly crystalline, adversely affects the dimensional precision of the endless belt if used in an increased proportion.

An electrically conductive filler, such as carbon black, is often incorporated into a molding resin to produce an conductive endless belt. However, the incorporated filler tends to reduce the mechanical properties.

Although various endless belts have hitherto been proposed and put to practical use as stated above, an endless belt satisfactory in mechanical properties such as flex resistance and Young's modulus, electrical properties such as resistance, as well as economy is unknown.

Various thermoplastic resins have been used in the structural or functional parts of OA equipment, which are exemplified by the aforementioned endless belt, the exterior and interior parts of automobiles, the structural parts of appliances, and the like. The thermoplastic resins for these applications are required to have a high elastic modulus, excellent flex resistance, excellent chemical resistance, dimensional precision, and, for some uses, transparency. Thermoplastic resins are roughly divided into crystalline ones and amorphous ones. In general, crystalline thermoplastic resins are excellent in flex resistance and chemical resistance but poor in dimensional stability because of their high mold shrinkage coefficient and have no transparency. On the other hand, amorphous thermoplastic resins are excellent in dimensional stability on molding and transparency but poor in chemical resistance.

To meet all the requirements for flex resistance, chemical resistance and dimensional stability on molding, polyblends of crystalline thermoplastic resins and amorphous thermoplastic resins have been studied for improvement on these properties. In the field of thermoplastic ester resins, for example, it has been reported that a crystalline ester resin and an amorphous ester resin can be finely dispersed mutually by accelerating interesterification (copolymerization). However, this technique has not yet been put to practical use for the following reasons. Firstly, accelerated interesterification (copolymerization) is accompanied by depolymerization to produce low-molecular weight components, which cause foaming on molding. Secondly, molecular chain cutting will proceed to reduce the molecular weight, which leads to reduction of mechanical characteristics (e.g., reduction of breaking extension) of the molded part. Suppressing the interesterification to prevent reduction in physical properties has been studied but not succeeded in providing a molded part excellent in both elastic characteristics (high elastic modulus) and flex resistance.

An object of the present invention is to provide a molded part, especially an endless belt, which has high elasticity and excellence in flex resistance, chemical resistance and dimensional stability on molding and is free from physical properties deterioration due to reaction during melt mixing.

Polyblends of thermoplastic resins are roughly divided into compatible ones and incompatible ones. Incompatible polyblends assume a sea-island structure because two thermoplastic resins are not completely mixed by melt blending. Where the two thermoplastic resins have largely different volume fractions, the one having a larger volume fraction is apt to form a continuous phase (sea) while the other is apt to form a discontinuous phase (islands). Where the difference of volume fraction is small, the difference in melt viscosity is influential on the disperse structure, and the one having a smaller melt viscosity tends to form a continuous phase while the other tends to form a discontinuous phase. Having of necessity interfaces between the continuous and the discontinuous phases, the incompatible polyblend is most liable to break at the interfaces, which seems to reduce flex resistance. Hence the present inventors have thought that flex resistance of a molded part would be improved by strengthening the interfaces by graft polymerization, block polymerization and the like.

On the other hand, the compatible polyblend usually has no interfaces between different resins, i.e., a non-sea-island structure. It is said that the physical properties, such as mechanical properties typified by flex resistance, of the compatible polyblend agree with the blending ratio of the two resins. Therefore, polyblending is not expected to bring about improvement on flex resistance. The present inventors considered that mechanical properties such as flex resistance would be improved greatly if the two materials are compatible with each other and also copolymerized. In other words, it is expected that a copolymerized state in a thermoplastic polyblend, whether compatible or incompatible, would improve the mechanical properties such as elastic modulus and flex resistance of the polyblend.

The inventors have paid their attention to polyester resins, which are inexpensive thermoplastic resins. It is known that polyesters, when blended, generally undergo mutual molecular cutting and exchanging called interesterification. The interesterification is said to generally involve molecular chain cutting to cause foaming or brittleness, resulting in reduction of mechanical characteristics. However, the inventors have thought that the interesterification reaction must be concurrently accompanied with copolymerization-like reaction and assumed that specific conditions would lead the interesterification reaction to copolymerization reaction while suppressing reduction of mechanical characteristics due to molecular chain cutting. Based on this assumption, the inventors have continued their study on the kinds and compositions of materials to be blended, the molding conditions and the like.

As a result, the following facts have been revealed. Firstly, a polyester resin mixture can produce (1) a polyblend having a sea-island structure, (2) a polyblend having a sea-island structure with the interfaces copolymerized, and (3) a polyblend having non-sea-island structure. The mechanical properties typified by flex resistance increase in the order of (1), (2) and (3). Addition of a third component such as a conductive filler to (2) (sea-island structure with copolymerized interfaces) or (3) (non-sea-island structure) induces little reduction in mechanical strength.

Secondly, where a conductive filler is added to control electrical resistance for specific uses, (2) (sea-island structure with copolymerized interfaces) or (3) (non-sea-island structure) has the filler fixed to the copolymerized resinous components and therefore exhibits electrical stability and hardly undergoes change in resistance with time.

Thirdly, (1) (sea-island structure) and (2) (sea-island structure with copolymerized interfaces) hardly stretch in a broad range of temperature and maintain a high elastic modulus and creep resistance even in high temperature or with passage of time for several days to as long as several years.

SUMMARY OF THE INVENTION

Based on these findings, the inventors have attested that a molded part obtained from a molding material prepared by mixing a crystalline resin, an amorphous resin, and a polymerization catalyst while heating is superior to one obtained by any of conventional techniques comprising control on interesterification reaction, etc. in terms of physical properties such as flex resistance. In addition, they have found that the molded part can possess transparency under some conditions.

The present invention provides a molded part obtained by mixing a crystalline resin having at least one of a hydroxyl group, a carboxyl group and an ester linkage, an amorphous resin having at least one of a hydroxyl group, a carboxyl group and an ester linkage, and a polymerization catalyst while heating to prepare a resin composition and molding the resin composition.

BRIEF DESCRIPTION OF DRAWINGS

FIG. 3 is a schematic side view of an intermediate transfer system of an image forming apparatus, in which:

1 . . . Photoreceptor drum

2 . . . Charger

3 . . . Optical system for exposure

4 . . . Developing unit

5 . . . Cleaner

6 . . . Electrically conductive endless belt 7, 8, 9 . . . Carrier roller

DETAILED DESCRIPTION OF THE INVENTION

[I] Crystalline Resin

The crystalline resin which can be used in the invention contains at least one of a hydroxyl group, a carboxyl group and an ester linkage and has a crystallinity usually of from 10 to 100%. As far as these conditions are satisfied, any general-purpose resins can be used.

Preferred crystalline resins are PATs (polyalkylene terephthalates), particularly polybutylene terephthalate (hereinafter "PBT"), polyethylene terephthalate (PET), and polyethylene naphthalate (PEN). PBT is especially preferred because of its high rate of crystallization. To have a higher rate of crystallization means a smaller dependence of crystallinity on molding conditions. The crystallinity of PBT is usually stable around 30%. The crystalline resin for use in the invention can comprise a copolymerization component as long as the effects of the invention are not impaired seriously. A copolymer having an ester linkage in its main chain and having an ester linkage such as polymethylene glycol introduced can be mentioned as an example of a crystalline copolymer resin.

While not limiting, the weight average molecular weight of the crystalline resin is usually about 10,000 to 100,000.

Within this range, a higher molecular weight is desirable where the demand for the mechanical properties such as breaking extension is high. In such cases, it is preferable for the crystalline resin to have a weight average molecular weight of 20,000 or more, preferably 25,000 or more, still preferably 30,000 or more.

[II] Amorphous Resin

The amorphous resin which can be used in the present invention contains at least one of a hydroxyl group, a carboxyl group and an ester linkage and has no crystallinity or a crystallinity usually of less than 10%. As far as these conditions are satisfied, any general-purpose resins can be used.

Suitable amorphous resins include polyesters such as PC and polyarylate (PAr) and those having an ester linkage in the side chain such as polymethyl methacrylate (PMMA). Polyesters are preferred, with PC being particularly preferred. The amorphous resin for use in the invention can comprise a copolymerization component as long as the effects of the invention are not impaired seriously. A copolymer having an ester linkage in its main chain and having an ester linkage such as polymethylene glycol introduced can be mentioned as an example of an amorphous copolymer resin.

While not limiting, the weight average molecular weight of the amorphous resin used in the invention is usually about 10,000 to 100,000. Within this range, a higher molecular weight is desirable where the demand for the mechanical properties such as breaking extension is high. In such cases, it is preferred for the amorphous resin to have a weight average molecular weight of 20,000 or more, preferably 25,000 or more, still preferably 30,000 or more.

The weight ratio of the crystalline resin and the amorphous resin to be blended is not particularly limited and can be decided arbitrarily taking into consideration that a crystalline resin is generally excellent in chemical resistance and flex resistance while an amorphous resin is generally excellent in dimensional stability on molding. The crystalline to amorphous resin weight ratio is usually 1/99 to 99/1, preferably 40/60 to 97/3, still preferably 60/40 to 95/5, particularly preferably 70/30 to 90/10. It is preferred to use the crystalline resin in a higher proportion than the amorphous one because (i) a small proportion of the amorphous resin suffices to improve dimensional stability on molding and (ii) a slight excess of the amorphous resin can result in noticeable reduction in chemical resistance, for example, resistance to the solvent of a coating.

It is preferred for the crystalline resin and the amorphous resin not to have a large difference in viscosity. If the difference in viscosity is too large, any adjustment of the preparation conditions might fail to obtain a satisfactorily uniform disperse system. Specifically, the viscosities of the crystalline resin and the amorphous resin are preferably such that the ratio of their melt flow rates (hereinafter "MFR") measured under the same conditions ranges 1/20 to 20/1, particularly 1/10 to 10/1. The MFR is measured in accordance with JIS K-7210. The measuring temperature is desirably close to the processing temperature of the polyblend. For example, in using PET and PC, their MFRs are measured at 260° C., which is the processing temperature of the PBT/PC polyblend, to compare their viscosities. The load applied in the measurement is conveniently 2.16 kg.

[III] Polymerization Catalyst

The polymerization catalyst to be used in the invention is not particularly limited. Catalysts for polyesters are usually used. Preferred are titanium-containing catalysts, such as alkyl titanates. Preferred of alkyl titanates are titanium tetrabutoxide and tetrakis(2-ethylhexyl) orthotitanate, which are commercially available, e.g., from E. I. Du Pont under trade names TYZOR TBT and TYZOR TOT, respectively.

The titanium-containing polymerization catalyst is preferably used in combination with an alkali metal-, alkaline earth metal- or zinc-containing compound, particularly a magnesium-containing compound. The magnesium-containing compound preferably includes organic acid salts, especially magnesium acetate, though not limited thereto.

The polymerization catalyst is used in such an amount that the metal content of the catalyst is not less than 1 ppm, preferably 10 ppm or more, still preferably 20 ppm or more, based on the total resins. Since an ester resin tends to depolymerize in the presence of a large quantity of a heavy metal as known in the art, the upper limit of the metal content is usually 10000 ppm, preferably 1000 ppm, still preferably 500 ppm.

Where the polymerization catalyst has too high activity, there is observed a tendency that the catalyst accelerates depolymerization. It follows that the molecular weight is reduced to reduce the mechanical properties of the molded part. Foaming which accompanies production of low-molecular weight components is also problematical. Such undesirable depolymerization can be suppressed under properly controlled molding conditions or in the presence of a chelator capable of chelating the metal of the polymerization catalyst. Useful chelators include phosphorous esters, phosphoric esters, phosphoric acid salts, and hydrazines. They are easily available from the market. For example, the phosphorous esters include Irgaphos 168 available from Chiba-Geigy (Japan) Ltd., PEP36 available from Asahi Denka Kogyo KK and PEPQ available from Clariant Japan K.K.; and the hydrazines include Irganox MD1024 available from Chiba-Geigy (Japan) Ltd. and CDA-6 available from Asahi Denka Kogyo K.K.

The chelator, where necessary, is added in an amount of 0.001 part by weight or more, preferably 0.01 part by weight or more, per part by total weight of resin. Note that an excess of the chelator tends to deactivate the polymerization catalyst, resulting in a failure to obtain a molded part with satisfactory physical properties. From this viewpoint, the upper limit of the amount of the chelator is usually 10 parts by weight, preferably 5 parts by weight.

In a highly preferred embodiment of the use of the chelator, the polymerization catalyst is used in a large amount within the above-specified preferred range, e.g., 50 to 500 ppm, the chelator is used in a large amount within the above-specified preferred range, e.g., 0.1 to 3 parts by weight, preferably 0.3 to 1 part by weight, and the molding conditions (temperature, residence time, etc.) are optimized. In this case, formation of chemical bonds between the crystalline resin and the amorphous resin and increase of molecular weight are accelerated while suppressing depolymerization thereby to produce a molded part having excellent physical properties not hitherto attained.

[IV] Other Components

If desired, the molded part of the present invention can comprise other components, such as other thermoplastic resins, elastomeric thermosetting resins, fillers, and other additives as long as the effects of the invention are not seriously impaired.

The thermoplastic resins that can be used in combination include polypropylene; high-density, medium-density, low-density or linear low-density polyethylene; propylene-ethylene block or random copolymers; rubber or latex components, such as ethylene-propylene copolymer rubber, styrene-butadiene rubber, styrene-butadiene-styrene block copolymer or a hydrogenation derivative thereof, polybutadiene, and polyisobutylene; polyamide, polyamideimide, polyacetal, polyarylate, polycarbonate, polyimide, liquid crystal polyester, polysulfone, polyphenylene sulfide, polybisamidotriazole, polyether imide, polyether ether ketone, acrylic resins, polyvinylidene fluoride, polyvinyl fluoride, polychlorotrifluoroethylene, ethylenetetrafluoroethylene copolymers, hexafluoropropylene-tetrafluoroethylene copolymers, tetrafluoroethylene-perfluoroalkyl vinyl ether copolymers, alkyl acrylate copolymers, polyester ester copolymers, polyether ester copolymers, polyether amide copolymers, polyurethane copolymers, and mixtures thereof.

The thermosetting resin include epoxy resins, melamine resins, phenolic resins, unsaturated polyester resins, and mixtures thereof.

The fillers include calcium carbonate (heavy or light), talc, mica, silica, alumina, aluminum hydroxide, zeolite, wollastonite, diatomaceous earth, glass fiber, glass beads, bentonite, asbestos, hollow glass beads, graphite, molybdenum disulfide, titanium oxide, carbon fiber, aluminum fiber, styrene steel fiber, brass fiber, aluminum powder, wood meal, rice hull, metal powder, conductive metal oxides, organometallic compounds, and organic metal salts.

Carbon black may be added for providing an electrical conductivity to the molded part of the present invention used as a seamless belt and the like. Examples of the carbon black include channel black, furnace black, acetylene black, and the like. The surface of the carbon black used may be treated with a coupling agent to improve the dispersibility. Examples of the coupling agent include silane coupling agents, aluminate coupling agents, titanate coupling agents, zirconate coupling agents, and the like. Single type of carbon black may be used or a plural types of carbon black may be used in combination. Carbon black may be added generally from 3 to 30% by weight, preferably from 10 to 20% by weight, based on the total weight of the composition.

The other additives which can be incorporated into the molded part include antioxidants (e.g., Irgaphos 168, Irganox 1010, and phosphorus type antioxidants), heat stabilizers, plasticizers, light stabilizers, ultraviolet absorbers, neutralizing agents, lubricants, anti-fogging agents, anti-blocking agents, slip agents, crosslinking agents, crosslinking aids, colorants, flame retardants, and dispersants.

[V] Heat Kneading and Molding

The crystalline resin, amorphous resin and polymerization catalyst are kneaded while heating to prepare a molten resin composition. The molten resin composition can be directly molded to obtain the molded part of the present invention or be once formed into a molding compound (e.g., pellets) which is molded afterward. It is also possible to once prepare a master batch from the crystalline resin, amorphous resin and polymerization catalyst by heat kneading, which is mixed with other resin composition to prepare a molding material. The heat-kneading conditions are selected so as to form bonds between the crystalline resin and the amorphous resin in the heat kneading stage either for preparing a resin composition or for molding. In either case, the heating temperature should be high enough for the mixture to be melted. Otherwise, sufficient dispersion is not achieved. Specifically, the melting point of the crystalline resin being taken as a guide, the heating temperature is preferably at or above the melting point of the crystalline resin, still preferably higher than the melting point by 10° C. or more. It should be noted, however, that too high a heating temperature tends to induce thermal decomposition, resulting in deterioration of the physical properties. From this viewpoint, the heating temperature is preferably not higher than (the melting point of the crystalline resin +80° C.), still preferably not higher than (the melting point of the crystalline resin+60° C.).

It is recommended to dry the materials to be mixed before heat kneading, in which case the resulting molded part tends to have better physical properties. In some cases the resin composition obtained by heat kneading may be subjected to heat treatment at or below its melting point to form ester bonds prior to molding.

It is considered that the polymerization catalyst promotes the reaction between the crystalline resin and the amorphous resin to produce a molded part with excellent physical properties. Since the reaction to be promoted is largely influenced by the heat kneading temperature and the time of heat application, the heat kneading conditions should be decided while monitoring the dispersed state of the resulting molded part. If low-molecular components are by-produced in the reaction and are not removed from the system, they will invite reduction of the molecular weight and cause foaming in the molded part. There seems to be the most satisfactory reaction state immediately before foaming occurs. Accordingly, in order to obtain the optimum heat kneading conditions, it is desirable, for example, that the residence time be set slightly shorter than the time when foaming takes place which can be determined through experimentation.

The means for heat kneading is not particularly limited, and any known techniques can be adopted. For example, the kneader to be used for once preparing a resin composition (molding compound) includes a single-screw extruder, a twin-screw extruder, a Banbury mixer, a roll, a Brabender Plastograph, and a kneader mixer. Known means can be used for obtaining molded parts from the molding compound, such as an injection molding machine and an extruder.

[VI] Analysis

Methods of analyzing the molded part of the invention are described below but are not limited thereto. In general, the molded part is dissolved in a solvent followed by filtration to remove the inorganic filler. Useful solvents include chloroform, methylene chloride, and hexafluoroisopropyl alcohol. The dissolved resinous component may be analyzed as such or, if necessary, isolated and purified by liquid chromatography or gel-permeation chromatography (GPC) before analysis. The thus purified resinous component is suited to determine the resin composition (e.g., PC, PET, etc.), identify the bonding residual groups, and evaluate the crystallinity in a usual manner, for example, by instrumental analyses such as NMR analysis. Further, the kind and amount of the polymerization catalyst in the molded part can easily be determined by ICP-AES and the like on the above-described resin solution.

(Chemical Bonds Between Crystalline Resin Molecular Chains and Amorphous Resin Molecular Chains)

According to the present invention, reaction is induced between the molecular chains of the crystalline resin and those of the amorphous resin in the presence of a polymerization catalyst to form chemical bonds therebetween. As a result, the mutual affinity of the two resins can be improved, and the mixed system can be finely dispersed in an accelerated manner, thereby to provide a molded part possessing both the high flex resistance inherent to the crystalline resin and the dimensional stability (and also transparency under some conditions) inherent to the amorphous resin.

The existing ratio of the chemical bonds is not particularly limited but is, in principle, preferably as high as possible. It is specifically preferred that the total mass of the crystalline resin and the amorphous resin be 1,000,000 g or smaller, particularly 300,000 g or smaller, especially 100,000 g or smaller, per mole of the chemical bond between the molecular chains of the crystalline resin and those of the amorphous resin.

The amount of the chemical bonds can be determined by, for example, NMR analysis. An illustrative example of the measurement by NMR is shown below, in which PBT was used as the crystalline resin, and PC as the amorphous resin.
Instrument: JEOL GSX400
Solvent: 1,1,1,2,2,2-hexafluoroisopropyl alcohol/d-chloroform=3/7 (by volume)
Number of times of integration: 128
Standard: TMS

Figure 1:
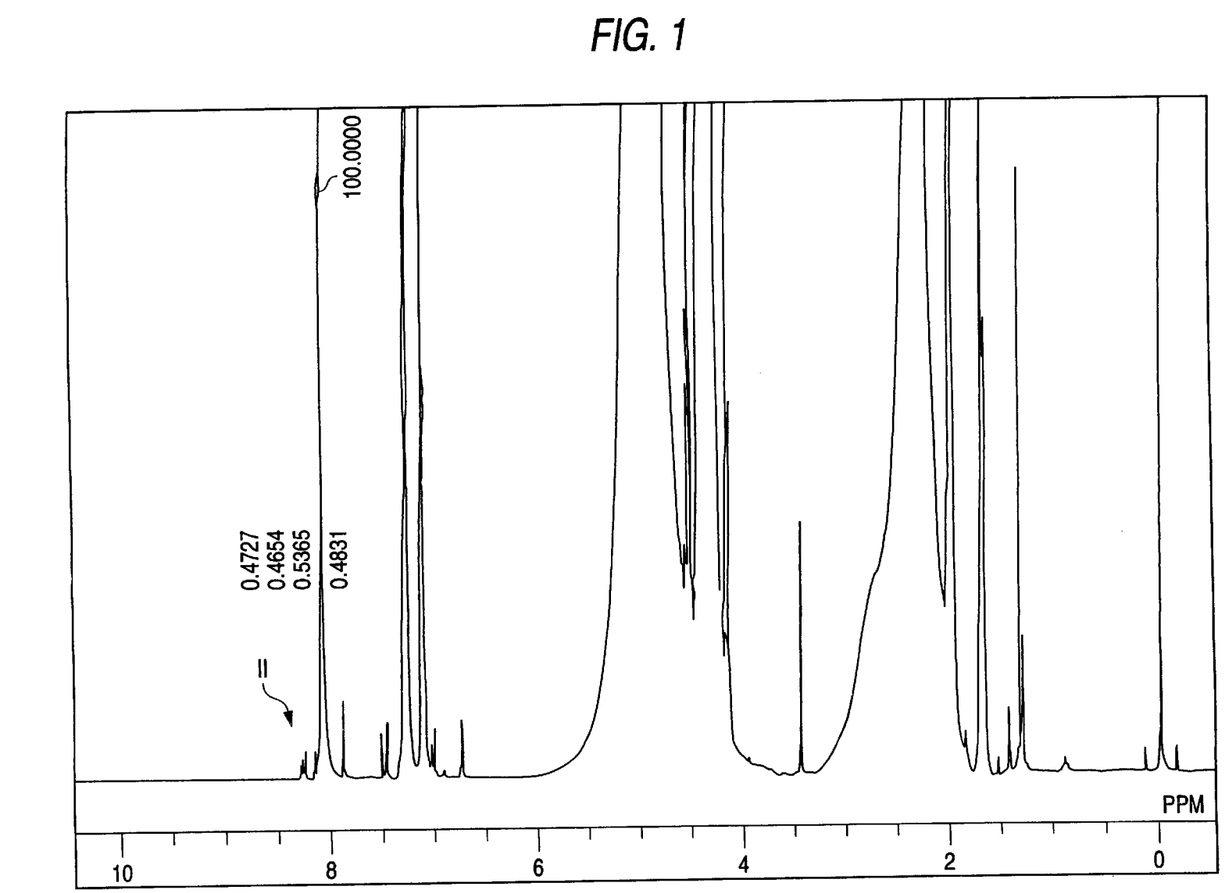
FIG. 1 is an NMR spectrum of a mixed and reacted product of polybutylene terephthalate and polycarbonate.
Figure 2:
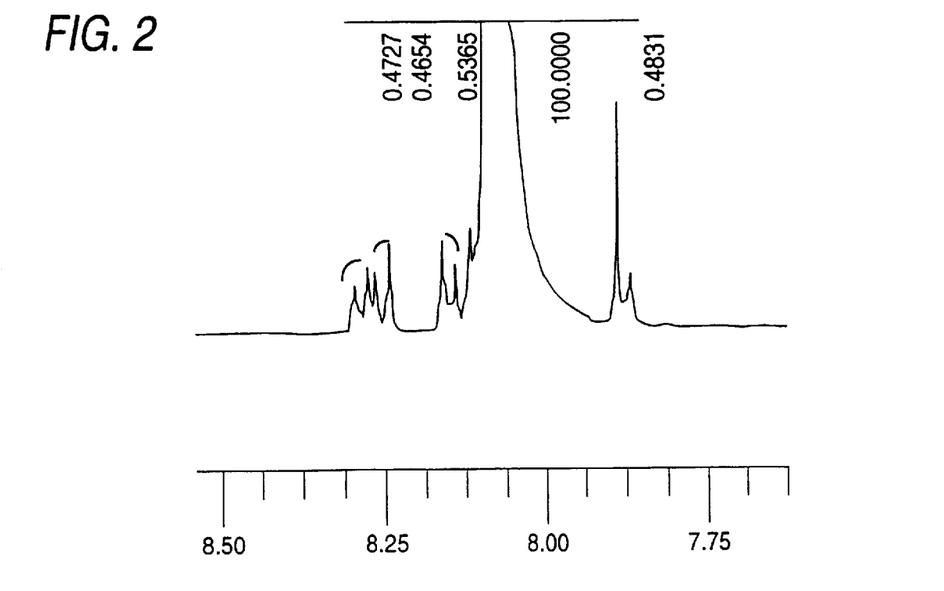
FIG. 2 is an enlarged view of part II of FIG. 1.

An example of the NMR spectra measured by this analysis is shown in FIGS. 1 and 2, FIG. 2 being the enlargement of part II in FIG. 1.

The hydrogen atoms on the benzene ring of terephthalic acid (hereinafter "TPA") show different chemical shifts between when the carboxyl group is bonded to butanediol and when it is bonded to bisphenol A (hereinafter "BPA"). As shown in the following formula, the four hydrogen atoms ($H^d$'s) on the TPA benzene ring in a PBT molecule are generally equivalent to each other and show a singlet peak at a chemical shift 8.07.

On the other hand, the hydrogen atoms on the TPA benzene ring of PBT bonded to BPA of PC has varied chemical shifts as shown in the following formula:

TPA (PBT derived )-TPA in BPA (PC derived)

That is, hydrogen atoms $H^b$'s and $H^c$'s show a doublet peak at 8.25 and 8.13, respectively.

The peak area ratio of (d) to [(b)+(c)] gives the ratio of (TPA in PBT molecule) to (TPA bonded to PC). In the particular example shown in FIGS. 1 and 2, (d):[(b)+(c)] area ratio=100:(0.4654+0.5635)≈99.01:0.99, indicating that the resin composition contains 0.99 mol of a TPA (of PBT origin)-BPA (of PC origin) bond per 100 mol of the PBT constituent unit. Since it is easily anticipated that the resin composition contains the same amount of a butanediol (of PBT origin)-carbon (of PC) bond, it is understood that there is 1.98 mol of a PBT-PC bond per 100 mol of the PBT constituent unit.

The PBT constituent unit (butanediol+TPA) having a formular weight of 220 as shown below, the PBT-PC bond content is 1.98 mol per 22000 (220×100 mol) g of PBT.

PBT-constituting unit
Formula weight: 220/one unit

Accordingly, the mass of PBT per mol of the PBT-PC bond is about 11000 (22000/1.98). In this example, the PBT/PC weight ratio being 7/3, the resinous content (PBT mass+PC mass) per mole of the PBT-PC bond is to be 16000 g (11000/0.7).

(Molecular Weight)

The improved physical properties of the molded part according to the present invention is believed to attributable to the chemical bonds between the molecular chains of the crystalline resin and those of the amorphous resin, the chemical bonds having been formed by heat kneading these resins in the presence of the polymerization catalyst while retaining or increasing the molecular weight of the resin composition as a whole. It is therefore preferred for the resin composition to have a molecular weight as high as possible. It is difficult to determine the true molecular weight where a copolymer exists as in the present invention. Hence in the present invention the weight average molecular weight of every resin was measured by GPC under the same conditions and processed by polystyrene conversion. The thus calculated value (hereinafter referred to as "PS-converted weight average molecular weight") was used as a common index. That is, a sample weighing 20 mg was dissolved overnight in a mixed solvent of 0.5 ml of 1,1,1,3,3,3-hexafluoro-2-propanol and 0.2 ml of chloroform, and 25 ml of a solvent as a mobile phase was added thereto. The solution was filtered through a 0.22 μm filter to prepare a sample solution for SEC measurement. The measurement was completed within 12 hours from the addition of the mobile phase.

SEC Measuring Conditions
Solvent: chloroform/acetic acid=99.5/0.5 (by volume)
Flow rate: 1.0 ml/min
Pour volume: 0.02 ml
Column: two AD806M/S columns (available from Showa Denko K.K.)
Column temperature: 30° C.
Detector: UV 254 nm Twelve monodisperse standard polystyrene samples having molecular weights varying from 500 (A-500) to 2,890,000 (F0288) (available from Tosoh Corp.) were analyzed to prepare a calibration curve, from which the PS-converted molecular weight of the sample was calculated.

The PS-converted weight average molecular weight of the resin composition obtained after heat kneading the crystalline resin, the amorphous resin and the polymerization catalyst (designated $Mw_3$) is usually represented by equation (1):

$$Mw_3 \geq \frac{X}{X+Y} \times Mw_1 + \frac{Y}{X+Y} \times Mw_2$$

wherein X is the compounding ratio (part by weight) of the crystalline resin; $Mw_1$ is the PS-converted weight average molecular weight of the crystalline resin; Y is the compounding ratio (part by weight) of the amorphous resin; and $Mw_2$ is the PS-converted weight average molecular weight of the amorphous resin.

$\mathrm{Mw}_3$ is preferably represented by equation (2):

$$Mw_3 \geq \left(\frac{X}{X+Y} \times Mw_1 + \frac{Y}{X+Y} \times Mw_2\right) \times 1.1$$

and still preferably represented by equation (3):

$$Mw_3 \geq \left(\frac{X}{X+Y} \times Mw_1 + \frac{Y}{X+Y} \times Mw_2\right) \times 1.2$$

It is important that $\mathrm{Mw}_3$ be greater than the arithmetic mean of $\mathrm{Mw}_1$ and $\mathrm{Mw}_2$ as a result of heat mixing. Even where the resin composition has a high molecular weight ($\mathrm{Mw}_3$) as a result of starting with resins having high molecular weights ($\mathrm{Mw}_1$ and $\mathrm{Mw}_2$), if the $\mathrm{Mw}_3$ is smaller than the arithmetic mean of $\mathrm{Mw}_1$ and $\mathrm{Mw}_2$, i.e., if the molecular weight reduces during heat mixing, it is not believed that satisfactory physical properties are expected of the resulting molded part. Although the absolute value of $\mathrm{Mw}_3$ is not particularly limited from this viewpoint, a higher molecular weight is desirable from overall viewpoint. $\mathrm{Mw}_3$ is usually 130,000 or more, preferably 140,000 or more, particularly preferably 150,000 or more.

The correlation between a true weight average molecular weight and a PS-converted weight average molecular weight is such that, for example, PBT having a weight average molecular weight of 40,000 and PC having a weight average molecular weight of 28,000 have a PS-converted weight average molecular weight of 122,000 and 64,000, respectively, as measured in accordance with the above-described method.

(Analysis of Melting Peak by DSC)

The molded part of the invention is superior in physical properties, such as dimensional stability on molding and flex resistance, to one obtained by conventional techniques involving control on such a reaction as interesterification. The superiority of the molded part in thermal history characteristics can be analyzed through thermal behavior in differential scanning calorimetry (DSC). The analysis on thermal behavior reveals the motions of high polymers on heat application, from microscopic segment motions to macroscopic motions. For example, microbrownian motion is observed at a glass transition point, and folding motion is observed at a melting point.

The molded part of the invention shows such a thermal behavior in DSC that the difference between the peak temperature indicating the melting peak in the first temperature rise and the peak temperature indicative of the melting peak in the second temperature rise following cooling is usually 30° C. or smaller, preferably 20° C. or smaller, particularly preferably 10° C. or smaller. These peaks furnish information of whether or not the molded part is in a state variable with time, namely, whether or not the molded part contains a portion remaining unreacted. It seems that a large difference between these peaks means that the molded part will suffer from great change with time in dimensions, mechanical properties and the like.

Where the difference between the melting peak temperature in the first temperature rise and that in the second temperature rise is greater than 30° C., the molded part undergoes a large reduction in tensile modulus in high temperature probably because it has a considerable amount of the resins remaining unreacted. In such a case, the endless belt tends to stretch or undergo deformation due to creep in a high temperature environment or in several days' to several years' running. Where the temperature difference is smaller than 30° C., the reduction in tensile modulus in high temperature is suppressed, and the creep is markedly reduced.

However satisfactory the room temperature mechanical properties, such as durability and tensile modulus, may be, a molded part which undergoes deterioration with time would be of no use as a precise component. Therefore, it is important that the above-described melting peak difference be in the specific range.

(Dispersion State)

It is known that in general two thermoplastic resins do not mix completely even in a molten state and take a flow structure. Where the two thermoplastic resins have largely different volume fractions, it is said that the one having a larger volume fraction is liable to form a continuous phase (sea) while the other is apt to form a discontinuous phase (islands). Where the difference in volume fraction is small, the difference in melt viscosity is influential on the sea-island structure, and the one having a smaller melt viscosity tends to form a continuous phase while the other tends to form a discontinuous phase.

The molded part according to the invention is a polyblend having a sea-island structure. Polyblends, particularly those comprising a crystalline component and an amorphous component or those containing a filler, etc. sometimes undergo structural change in a cooling step following a heat melting step. For example, when the resin mixture is rapidly cooled or in the presence of a filler, etc., the material that is ought to crystallize sometimes fail to crystallize completely and partially remains in its amorphous state in the resulting molded part. In such cases, the molded part may resume crystallization when exposed to high temperature, resulting in considerable shrinkage or extreme reduction in mechanical strength.

In order to prevent such a phenomenon, the crystallizable component out of the materials to be alloyed should take a crystallized state in the molded part. While a polyblend obtained by general melt mixing could have the dispersed particle size reduced no smaller than about 100 nm, the present invention makes it possible to finely disperse the resins to a particle size of several nanometers or smaller under properly selected conditions thereby to provide a practically transparent molded part. While not limiting, the dispersed state can be observed by examining a superthin section of a sample stained with ruthenium tetroxide under a transmission electron microscope.

(Heat Treatment)

If desired, the resulting molded part can be subjected to heat treatment to further improve the physical properties. The heat treatment is usually carried out, while depending on the starting resins, at 60 to 200° C., preferably 70 to 120° C., for 5 to 60 minutes, preferably 10 to 30 minutes. The heat treatment is particularly effective on endless belts, etc. hereinafter described in improving flex life and tensile modulus.

[VII] Use of Molded Part

The use of the molded part according to the invention broadly includes, but is not limited to, structural or functional parts of OA equipment, exterior and interior parts of automobiles, structural parts of appliances, general-purpose films, and so on. Inter alia, they are useful in the field of OA equipment, especially as functional parts, where the demands for dimensional precision, flex resistance, breaking extension, etc. are strict. For example, endless belts according to the invention exhibit excellent performance with few defects such as cracks and stretch when used as an intermediate transfer belt, a carrier transfer belt, a photoreceptor belt, and the like in image forming apparatus such as electrophotographic copying machines, laser beam printers, and facsimiles.

(Endless Belt)

The endless belt, which is one of the successful applications of the molded part of the invention, is preferably obtained by mixing and pelletizing the crystalline resin, the amorphous resin, and the polymerization catalyst in, e.g., a twin-screw extruder and molding the pellets.

Molding methods include, but are not limited to, continuous melt extrusion, injection molding, blow molding, and blown-film extrusion. Continuous melt extrusion is the most desirable. In particular, an internal cooling mandrel system in downward extrusion which achieves accurate control of the tubing inner diameter or a vacuum sizing system are preferred. The internal cooling mandrel system is the most preferred. It is desirable that the temperature and residence time in the molding be adjusted in conformity to each formulation so as to give a molded part with satisfactory physical properties. It is a particularly preferred embodiment to produce an endless belt, namely, a seamless belt in this manner.

(Physical Properties of Endless Belt)

The endless belt obtained in the invention can have the following physical properties.

(1) Thickness

Where a carrier roller on which an endless belt runs has a small curvature, it is likely that a too thick endless belt breaks due to a large difference of deformation between the outer and inner surfaces thereof and causes the toner transferred to the outer side thereof to be deformed or scattered, resulting in image distortion. On the other hand, a too thin endless belt is also apt to develop cracks and break by scratches by slight dust having entered between the roller and the belt or by contact with a photoreceptor, etc. Accordingly, the endless belt of the invention usually has a thickness of 50 to 1000 $\mu$m, preferably 70 to 300 $\mu$m, still preferably 100 to 200 $\mu$m.

(2) Flex Resistance

Where an endless belt is applied in an image forming apparatus as, for example, an intermediate transfer belt, it should have satisfactory flex resistance. Otherwise cracks may develop, resulting in a failure to form an image. The flex resistance can be evaluated quantitatively in terms of number of flexings measured in accordance with JIS P-8115 (Determination of folding endurance by MIT tester) (hereinafter sometimes referred to as a flex life). An endless belt showing a larger number of flexings to break is less liable to cracking and more flex-resistant. To secure the function as an endless belt, the number of flexings to break should generally be 500 or greater. A preferred number of flexings to break is 5000 or greater, particularly 10,000 or greater. An endless belt whose number of flexings to break is 30,000 or greater is substantially free from crack development.

(3) Tensile Modulus

It is preferred for an endless belt to have a high tensile modulus. When applied to an image forming apparatus as, e.g., an intermediate transfer belt, an endless belt with a low tensile modulus would stretch slightly, which may cause such defects as color shearing. A preferred tensile modulus is 1500 MPa or more, particularly 2,000 MPa or more. A tensile modulus of 2,500 MPa or more is the most preferred for markedly suppressing such defects as color shearing. Note that an endless belt having too high a tensile modulus not only imposes an excessive load to the belt driving motor but easily initiates cracking. From this viewpoint, the tensile modulus of the endless belt is usually 5000 MPa or less, preferably 4500 MPa or less.

The temperature dependence of the tensile modulus is usually such that the tensile modulus at 40° C. is 60% or more, preferably 70% or more, particularly preferably 80% or more, of that at 5° C. and that the tensile modulus at 60° C. is 20% or more, preferably 40% or more, particularly preferably 60% or more, of that at 5° C. In other words, it is preferred that the tensile modulus shows a slight change as temperature increases from 5° C. to 40° C. and a moderate reduction as temperature increases from 40° C. to 60° C. If the tensile modulus at 40° C. is less than 60% of that at 5° C., the belt used in a printer, a copier, etc. tends to stretch in summer or under a high temperature condition, resulting in image distortion or creep. It is important for the tensile modulus at 60° C. to be usually 20% or more of that at 5° C. If the tensile modulus at 60° C. is less than 20% of that at 5° C., the belt is liable to suffer from dimensional changes due to creeping over several days' or several years' use.

Generally speaking, soft plastics tend to have a long flex life but a low tensile modulus, whereas rigid plastics tend to have a high tensile modulus but are brittle, having a short flex life. One of the advantages of the present invention lies in that the molded part has a long flex life while retaining a high tensile modulus inherent to PBT or PC.

(4) Breaking Extension

It is significant for the endless belt to have a breaking extension usually of 30% or more, preferably 50% or more, particularly preferably 100% or more, in a tensile test. In general, a molded part having a higher elastic modulus is less stretchy and has a smaller breaking extension. However, it has turned out to be important for the endless belt to have a moderate thickness and a breaking extension usually of 30% or more in both the circumferential and width directions as well as a high elastic modulus in order to reduce image distortion and to prevent crack propagation to maintain long-term durability. An endless belt whose breaking extension is smaller than 30% tends to allow cracks to propagate and has insufficient durability for withstanding the service life of the image forming apparatus which is said to be 200,000 to 300,000 copies.

(5) Surface Resistivity and Volume Resistivity

According to necessity, the endless belt of the invention can be made electrically conductive by incorporating a conductive filler or a substance that can develop conductivity. While depending on the use, the resistance of the belt can be set at a surface resistivity of from $1 \times 10^1$ to $1 \times 10^{16}$ $\Omega$ or a volume resistivity of from $1 \times 10^1$ to $1 \times 10^{16}$ $\Omega \cdot$cm. More specifically, an endless belt for use as a photoreceptor belt preferably has a low resistivity, e.g., a surface resistivity of $1 \times 10^1$ to $1 \times 10^9$ $\Omega$ or a volume resistivity of $1 \times 10^1$ to $1 \times 10^9$ $\Omega \cdot$cm, so as to allow the charges on the outer surface to escape to the inner surface. An endless belt for use as an intermediate transfer belt preferably has such a resistivity as to facilitate static electrification and elimination, e.g., a surface resistivity of $1 \times 10^6$ to $1 \times 10^{13}$ $\Omega$ or a volume resistivity of $1 \times 10^6$ to $1 \times 10^{13}$ $\Omega \cdot$cm. An endless belt for use as a carrier transfer belt preferably has such a high resistivity as to secure chargeability and resistance to break under a high voltage, e.g., a surface resistivity of $1 \times 10^{10}$ to $1 \times 10^{16}$ $\Omega$ or a volume resistivity of $1 \times 10^{10}$ to $1 \times 10^{16}$ $\Omega \cdot$cm.

It is desirable for the endless belt to have a narrow distribution of surface resistivity. More specifically, the exponential difference between the maximum and the minimum surface resistivities of a single endless belt, both falling within the above-mentioned preferred range, is preferably two or smaller. The surface resistivity of an endless belt can easily be measured with, e.g., Hiresta or Loresta manufactured by Dia Instruments Ltd. or R8340A manufactured by Advantest Corp.

The present invention will now be illustrated in greater detail with reference to Examples, but it should be understood that the invention is not construed as being limited thereto.

In Examples and Comparative Examples, the following materials were used according to the composition shown in Tables 1 to 3 (all the parts are by weight).

PBT (crystalline ester resin): Weight average molecular weight: 40,000; PS-converted weight average molecular weight: 122,000

PC (amorphous ester resin): Weight average molecular weight: 28,000; PS-converted weight average molecular weight: 64,000

Polymerization catalyst: Titanium tetrabutoxide and magnesium acetate

Heat stabilizer: Phosphorus type antioxidant PEPQ, available from Clariant Japan K.K.

Carbon black: DENKA BLACK, available from Denki Kagaku Kogyo K. K.

(Heat Kneading)

The materials were kneaded and pelletized by means of a twin-screw extruder PMT32 (supplied by IKG K.K.) under the conditions shown in Tables 1 to 3.

(Production of Endless Belt)

The pellets were dried and extruded downward from an extruder having a diameter of 40 mm through a ring die having a diameter of 180 mm into a molten tube, set under cooling, took-off as a tube, and cut to lengths of 340 mm to make conductive endless belts. The molding conditions are shown in Tables.

(Evaluation)

The resulting endless belts were cut into specimens of appropriate sizes and evaluated according to the following methods.

1) Flex Life (Number of Flexings)

Measurement was made in accordance with JIS P-8115. A 15 mm wide and 100 mm long specimen was given 175 flexes/min at left and right flexing angles of 135° under a tensile load of 1.5 kgf by an MIT tester, and the number of flexings to break was measured.

2) Surface Resistivity ($\Omega$)

Resistance meters are selectively used according to the level of resistivity.

For samples whose resistivity ranged from 1 to $1 \times 10^6$ $\Omega/\square$, surface resistivity was measured with Row Rester supplied from Dia Instruments Ltd. at a pitch of 20 mm in the circumferential direction.

For samples whose resistivity ranged from $10^6$ to $1 \times 10^{13}$ $\Omega$, surface resistivity was measured with Hiresta (HA terminal) supplied from Dia Instruments Ltd. at a pitch of 20 mm in the circumferential direction under conditions of 500 V and 10 seconds.

For samples whose resistivity ranged from $10^{13}$ to $1 \times 10^{16}$ $\Omega$, surface resistivity was measured with an ultrahigh resistance meter R8340A (JIS electrode) supplied by Advantest Corp. at a pitch of 100 mm in the circumferential direction under conditions of 500 V and 10 seconds.

For the evaluation, 10-second values were used.

3) Volume Resistivity ($\Omega \cdot cm$)

Volume resistivity was measured with Hiresta HRS Probe supplied by Dia Instruments Ltd. at a pitch of 20 mm in the circumferential direction under conditions of 100 V and 10 seconds.

4) DSC

DSC was carried out with SSC-5200 available from Seiko Electronic Components Ltd. at a rate of temperature rise of 10° C./min. The first DSC measurement, in which the sample was heated up to 300° C., was followed by cooling to room temperature at a rate of 10° C./min. The sample was again heated under the same conditions to make the second DSC measurement. The difference between the melting peak temperature of the first DSC curve and that of the second DSC curve was obtained.

5) Thickness

The thickness of the endless belt was measured with a micrometer manufactured by Tokyo Seimitsu Co., Ltd. at a pitch of 20 mm in the circumferential direction.

6) Belt Durability

The endless belt was set in an image forming apparatus as an intermediate transfer member, and image formation was carried out continuously. The durability of the belt was evaluated in terms of the number of output copies until crack development.

Figure 3:
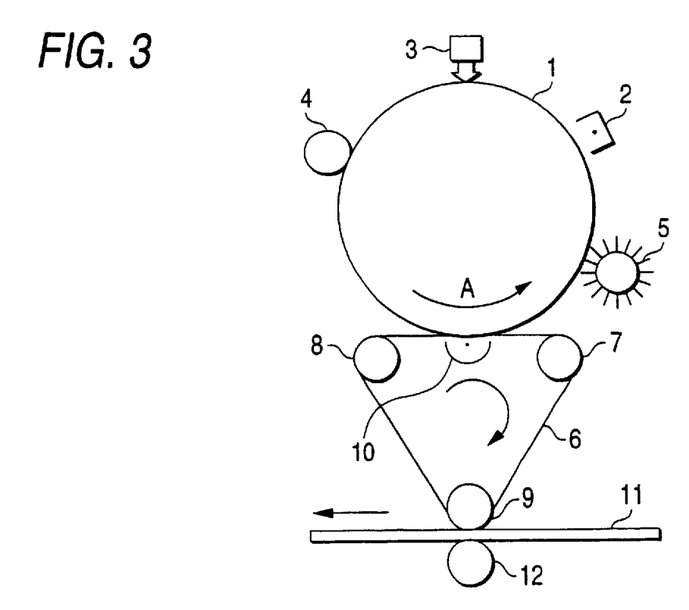

FIG. 3 is a schematic side view of the intermediate transfer system of the image forming apparatus used in the belt durability test. Around a photosensitive drum (photoreceptor) 1 are disposed electrophotographic processing units, i.e., a charger 2, an optical system 3 for exposure using a semiconductor laser, etc. as a light source, a developing unit 4 containing a toner, and a cleaner 5 for clearing residual toner off the photoreceptor 1. A conductive endless belt 6 put over carrier rollers 7, 8 and 9 moves in the direction shown by the arrow synchronously with the photoreceptor 1 revolving in the direction shown by the arrow. Image formation with this system is carried out as follows. The surface of the photoreceptor 1 revolving in the direction shown by arrow A is uniformly charged by the charger 2 and then imagewise exposed to light of the optical system 3 according to the signals from an image reading unit, etc. (not shown) to form an electrostatic latent image on the photoreceptor 1. The latent image is visualized with the developing unit 4 into a toner image, which is electrostatically transferred onto the endless belt 6 by an electrostatic transfer unit 10 and then transferred to recording paper 11 which is passing between the carrier roller 9 and a back-up roller 12.

EXAMPLE 1

PBT, PC, titanium tetrabutoxide, magnesium acetate, and PEPQ (heat stabilizer) were preliminarily dried at about 130° C. and kneaded while heating in the twin-screw extruder to prepare pellets. The resin temperature and the residence time in the twin-screw extruder were controlled so as to suppress reaction in this stage. The pellets were subjected to melt extrusion using a ring die having a diameter of 180 mm, while controlling the amount of extrusion and the take-off speed, to form a film having a thickness of 140 µm. During the film extrusion, the resin temperature and the residence time were controlled so that reaction might proceed to an adequate degree within the extruder for providing a transparent film. The disperse structure, PS-converted weight average molecular weight (Mw), mechanical and electrical properties, and appearance of the resulting extruded film are shown in Table 1. When the film was heat treated at 80° C. for 10 minutes, the tensile modulus increased by 5%.

COMPARATIVE EXAMPLE 1

An extruded film was obtained in the same manner as in Example 1, except for using no polymerization catalysts. In order to exclude the influences of the metal content present in PBT, the PBT was used after it was dissolved in a solvent, filtered in a column, and freed of the solvent. Unlike Example 1, a transparent film was not obtained however the molding conditions (molding temperature and residence time) were adjusted. The disperse structure, characteristics, and appearance of the resulting film are shown in Table 1.

TABLE 1

|  |  | Example 1 | Compara. Example 1 |
|---|---|---|---|
| Composition |  |  |  |
| PBT |  | 70 parts | 70 parts |
| PC |  | 30 parts | 30 parts |
| Catalyst (based on total weight of resin) | Ti Content | 60 ppm |  |
|  | Mg Content | 25 ppm |  |
| PEPQ |  | 0.3 part | 0.3 part |
| Kneading Conditions |  |  |  |
| Set Temp. |  | 230° C. | 230° C. |
| Main Screw Speed |  | 150 rpm | 150 rpm |
| Throughput |  | 15 kg/hr | 15 kg/hr |
| Residence Time |  | ca 2 min | ca. 2 min |
| Molding Conditions |  |  |  |
| Molding Temp. |  | 260° C. | 260° C. |
| Residence Time |  | 6 min | 6 min |
| Thickness |  | 140 μm ± 14 μm | 140 μm ± 14 μm |
| Belt Physical Properties |  |  |  |
| Disperse Structure | Form | sea-island (fine dispersion) | sea-island |
|  | Dispersed Particle Size | ≦1 mn | ca. 100 nm |
| PS-Converted Mw |  | 150,000 |  |
| Mechanical Properties | Flex Life | 90,000 | 5,000 |
|  | Tensile Modulus | 2200 MPa | 2300 MPa |
|  | Breaking Extension | 340% | 90% |
| Surface Resistivity | Maximum | 5 × 10$^{15}$ Ω | 5 × 10$^{15}$ Ω |
|  | Minimum | 2 × 10$^{16}$ Ω | 1 × 10$^{15}$ Ω |
| Appearance |  | transparent | white (opaque) |

EXAMPLE 2

PBT, PC, titanium tetrabutoxide, magnesium acetate, PEPQ, and carbon black were preliminarily dried and then kneaded while heating to prepare pellets. The pellets were subjected to the continuous melt extrusion using a ring die having a diameter of 180 mm and an internal cooling mandrel having an outer diameter of 170 mm, while controlling the amount of extrusion and the take-off speed, to form a seamless endless belt having an inner diameter of 169 mm. As shown in Table 2, the resulting belt was excellent in mechanical properties, having a flex life of 58,000 and a high tensile modulus. When the belt was used as an intermediate transfer belt on the image forming apparatus shown in FIG. 3, satisfactory images were produced. No cracks developed even after obtaining 100,000 copies in continuous image formation.

It is considered that a molded part with satisfactory physical properties can be obtained by properly setting the residence time and molding temperature in the kneading for molding. When the endless belt was heat treated at 80° C. for 20 minutes, the tensile modulus increased by 8%.

EXAMPLE 3

An endless belt was obtained in the same manner as in Example 2, except for changing the PBT/PC weight ratio and increasing the residence time in molding. In this case, too, the resulting belt exhibited satisfactory physical properties as shown in Table 2. It is assumed that the necessity of extending the residence time in molding arose because the change in the PBT/PC ratio shifted the optimum reaction conditions for the system. When the endless belt was heat treated at 80° C. for 10 minutes, the tensile modulus increased by 5%.

EXAMPLE 4

The same procedure of Example 2 was repeated, except for decreasing the carbon black content, to obtain an endless belt having an increased surface resistivity. As shown in Table 2, the molded article showed a uniform disperse system and satisfactory physical properties similarly to Example 2. When the belt was used as a carrier transfer belt on an image forming apparatus, satisfactory images were produced.

EXAMPLE 5

The same procedure of Example 2 was repeated, except for increasing the carbon black content, to obtain an endless belt having a reduced surface resistivity. As shown in Table 2, the molded article also showed a uniform disperse system and satisfactory physical properties. When the belt was used in an image forming apparatus as a photoreceptor belt on which a photosensitive layer was provided, satisfactory images were produced. When the endless belt was heat treated at 80° C. for 10 minutes, the tensile modulus increased by 7%.

COMPARATIVE EXAMPLE 2

An endless belt was obtained in the same manner as in Example 2, except for using no polymerization catalysts. In order to exclude the influences of the metal content present in PBT, the PBT was used after it was dissolved in a solvent, filtered in a column, and freed of the solvent. The resulting belt was equal to that of Example 2 in tensile modulus but inferior in flex life. Microscopic observation revealed a sea-island structure in which PC formed islands. When the resulting belt was used in an image forming apparatus as an intermediate transfer belt, satisfactory images were produced, but cracks developed after 8000 copies had been produced continuously.

TABLE 2

|  |  | Example 2 | Example 3 | Example 4 | Example 5 | Comp. Example 2 |
|---|---|---|---|---|---|---|
| Composition | PBT (part by weight) | 60 | 77 | 60 | 60 | 60 |
|  | PC (part by weight) | 26 | 9 | 26 | 26 | 26 |

TABLE 2-continued

|  |  |  | Example 2 | Example 3 | Example 4 | Example 5 | Comp. Example 2 |
|---|---|---|---|---|---|---|---|
|  | Catalyst (ppm, based on total weight of resin) | Ti Content | 60 | 60 | 60 | 60 |  |
|  |  | Mg Content | 25 | 25 | 25 | 25 |  |
|  | Carbon Black (part by weight) |  | 14 | 14 | 11 | 17 | 14 |
|  | PEPQ (part by weight) |  | 0.3 | 0.3 | 0.3 | 0.3 | 0.3 |
| Kneading Conditions | Set Temp. (° C.) |  | 230 | 230 | 230 | 230 | 250 |
|  | Main Screw Speed (rpm) |  | 150 | 150 | 150 | 150 | 150 |
|  | Throughput (kg/hr) |  | 15 | 15 | 15 | 15 | 40 |
|  | Residence Time (min) |  | ca. 2 | ca. 2 | ca. 2 | ca. 2 | ca. 2 |
| Molding Conditions | Molding Temp. (° C.) |  | 260 | 260 | 260 | 260 | 260 |
|  | Residence Time (min) |  | 12 | 20 | 11 | 14 | 12 |
| Thickness ($\mu$m) |  |  | 140 ± 14 | 140 ± 14 | 140 ± 14 | 140 ± 14 | 140 ± 14 |
| Belt Physical Properties | Disperse Structure | Form | non-sea-island | non-sea-island | non-sea-island | non-sea-island | sea-island |
|  |  | Dispersed Particle Size | * | * | * | * | ca.100 |
|  | PS-Converted Mw |  | 25,100 |  |  |  | 99,900 |
|  | Mechanical Properties | Flex Life | 58,000 | 51,000 | 70,000 | 32,000 | 3,000 |
|  |  | Tensile Modulus (MPa) | 2600 | 2600 | 2500 | 2700 | 2700 |
|  |  | Breaking Extension (%) | 340 | 360 | 360 | 280 | 80 |
|  | Surface Resistivity ($\Omega$) | Maximum | $5.0 \times 10^{10}$ | $4.0 \times 10^{10}$ | $8.2 \times 10^{12}$ | $7.0 \times 10^{5}$ | $4.0 \times 10^{10}$ |
|  |  | Minimum | $9.0 \times 10^{9}$ | $8.0 \times 10^{9}$ | $1.0 \times 10^{12}$ | $3.0 \times 10^{5}$ | $1.0 \times 10^{10}$ |
|  | Belt Durability |  | No cracks developed after making 100,000 copies | No cracks developed after making 100,000 copies | No cracks developed after making 100,000 copies | No cracks developed after making 100,000 copies | Cracks developed after making 8000 copies |

*No clear particle boundary

EXAMPLES 6 TO 12

PBT, PC, titanium tetrabutoxide, magnesium acetate, and PEPQ were preliminarily dried at about 130° C. and then kneaded while heating to prepare pellets. The resin temperature and the residence time in the kneading were controlled so as to suppress reaction in this stage. The pellets were subjected to the continuous melt extrusion using a ring die having a diameter of 180 mm and an internal cooling mandrel having an outer diameter of 170 mm, while controlling the amount of extrusion and the take-off speed, to form a seamless endless belt having an inner diameter of 169 mm. The extrusion molding conditions were designed as shown in Table 3 so that reaction might proceed to an adequate degree within the extruder for providing an endless belt. The disperse structure, mechanical and electrical properties, and durability of the resulting endless belt are shown in Table 3.

COMPARATIVE EXAMPLE 3

An endless belt was obtained in the same manner as in Example 6, except for using no polymerization catalysts. In order to exclude the influences of the metal content present in PBT, the PBT was used after it was dissolved in a solvent, filtered in a column, and freed of the solvent. The disperse structure, mechanical and electrical properties, and durability of the resulting endless belt are shown in Table 3.

EXAMPLE 13

An endless belt having a non-sea-island structure in which PBT and PC were uniformly dispersed in each other was obtained in the same manner as in Examples 6 to 12, except for selecting the kneading conditions and the molding conditions so as not to form a sea-island structure. The disperse structure, mechanical and electrical properties, and durability of the resulting endless belt are shown in Table 3.

TABLE 3

|  |  |  | Example 6 | Example 7 | Example 8 | Example 9 | Example 10 | Example 11 | Example 12 | Example 13 | Comp. Example 3 |
|---|---|---|---|---|---|---|---|---|---|---|---|
| Composition | PBT (part by weight) |  | 60 | 77 | 60 | 60 | 60 | 60 | 60 | 60 | 60 |
|  | PC (part by weight) |  | 26 | 9 | 29 | 25 | 26 | 26 | 26 | 26 | 26 |
|  | Catalyst (based on total weight of resin) | Ti Content (ppm) | 60 | 60 | 60 | 60 | 60 | 60 | 60 | 60 | 0 |
|  |  | Mg Content (ppm) | 25 | 25 | 25 | 25 | 25 | 25 | 25 | 25 | 0 |

TABLE 3-continued

|  |  | Example 6 | Example 7 | Example 8 | Example 9 | Example 10 | Example 11 | Example 12 | Example 13 | Comp. Example 3 |
|---|---|---|---|---|---|---|---|---|---|---|
|  | Carbon Black (part by weight) | 14 | 14 | 11 | 16 | 0 | 14 | 14 | 14 | 14 |
|  | PEPQ (part by weight) | 1 | 0.3 | 1 | 0.3 | 1 | 1 | 1 | 0.3 | 1 |
| Knead-ing Condi-tions | Temperature (° C.) | 260 | 240 | 240 | 240 | 240 | 240 | 240 | 250 | 240 |
|  | Screw Speed (rpm) | 150 | 150 | 150 | 150 | 150 | 150 | 150 | 150 | 150 |
|  | Throughput (kg/hr) | 15 | 15 | 15 | 15 | 15 | 20 | 20 | 20 | 15 |
|  | Residence Time (min) | ca. 2 | ca. 2 | ca. 2 | ca. 2 | ca. 2 | ca. 2 | ca. 2 | ca. 2 | ca. 2 |
| Molding Condi-tions | Molding Temp. (° C.) | 240 | 240 | 240 | 240 | 240 | 240 | 240 | 260 | 240 |
|  | Residence Time (min) | ca. 12 | ca. 13 | ca. 12 | ca. 12 | ca. 13 | ca. 16 | ca. 10 | ca. 10 | ca. 10 |
| Flex Life |  | 20,000 | 35,000 | 25,000 | 15,000 | 25,000 | 10,000 | 40,000 | 90,000 | 3,400 |
| Tensile Modulus (MPa) | 5° C. | 2700 | 2600 | 2800 | 2600 | 2300 | 2700 | 2700 | 2400 | 2800 |
|  | 40° C. | 2300 | 2200 | 2500 | 2300 | 2000 | 2300 | 2300 | 2100 | 2600 |
|  | 60° C. | 1300 | 1000 | 1100 | 1400 | 1000 | 1300 | 1300 | 300 | 1300 |
| Melting Peak Temp. Difference between 1st and 2nd DSC (° C.) |  | 10 | 5 | 6 | 4 | 15 | 8 | 10 | 35 | 2 |
| Thickness ($\mu$m) |  | 140 ± 10 | 140 ± 10 | 140 ± 10 | 140 ± 10 | 140 ± 10 | 200 ± 18 | 100 ± 5 | 140 ± 10 | 140 ± 10 |
| Surface Resistivity ($\Omega$) | min. | $1 \times 10^{10}$ | $1 \times 10^{10}$ | $1 \times 10^{12}$ | $1 \times 10^{7}$ | $1 \times 10^{15}$ | $2 \times 10^{8}$ | $2 \times 10^{10}$ | $1 \times 10^{10}$ | $2 \times 10^{9}$ |
|  | max. | $4 \times 10^{10}$ | $6 \times 10^{10}$ | $8 \times 10^{12}$ | $3 \times 10^{7}$ | $3 \times 10^{15}$ | $8 \times 10^{8}$ | $8 \times 10^{10}$ | $8 \times 10^{9}$ | $8 \times 10^{9}$ |
| Volume Resistivity ($\Omega \cdot$ cm) | min. | $1 \times 10^{9}$ | $2 \times 10^{10}$ | $1 \times 10^{12}$ | $1 \times 10^{7}$ | $1 \times 10^{15}$ | $1 \times 10^{9}$ | $1 \times 10^{10}$ | $1 \times 10^{10}$ | $1 \times 10^{10}$ |
|  | max. | $8 \times 10^{9}$ | $9 \times 10^{10}$ | $8 \times 10^{12}$ | $3 \times 10^{7}$ | $3 \times 10^{15}$ | $8 \times 10^{9}$ | $8 \times 10^{10}$ | $8 \times 10^{10}$ | $8 \times 10^{10}$ |
| Belt Dura-bility | Crack Development* | 200,000 | 200,000 | 200,000 | 200,000 | 200,000 | 200,000 | 200,000 | 200,000 | developed after making 60,000 copies |
|  | Image Distortion** by Stretch | 200,000 | 200,000 | 200,000 | 200,000 | 200,000 | 200,000 | 200,000 | observed after making 60,000 copies | observed after making 60,000 copies |
| Disperse Structure |  | sea-island | sea-island | sea-island | sea-island | sea-island | sea-island | sea-island | non-sea-island | sea-island |
| Overall Judgement |  | good | good | good | good | good | good | good | acceptable | bad |

*The number of output copies obtained without crack development of the belt.
**The number of output copies obtained without image distortion.

As can be seen from Table 3, any of the endless belts according to the present invention has a high tensile modulus over a broad temperature range, excellent durability, and satisfactory flex resistance. To the contrary, the belt of Comparative Example 3, which was prepared without a polymerization catalyst has insufficient flex resistance and develops cracks and image distortion after obtaining 60,000 copies. In Example 13, although the polymerization catalysts were used, the kneading and molding temperatures were set high, which resulted in formation of a non-sea-island structure. Therefore, the belt of Example 13 shows a large difference in DSC melting temperature between the first measurement and the second measurement. As a result, it has a small tensile modulus in the high temperature (60° C.), and image distortion took place after making 60,000 copies due to stretch of the belt.

The present invention provides a molded part which has a high tensile modulus, is excellent in flex resistance, chemical resistance and dimensional stability on molding, and shows freedom from deterioration of physical properties due to reaction during melt mixing. The molded part of the invention is especially suited as an endless belt.

While the invention has been described in detail and with reference to specific embodiments thereof, it will be apparent to one skilled in the art that various changes and modifications can be made therein without departing from the spirit and scope thereof.

This application is based on Japanese patent applications No. Hei. 11-372335, No. Hei. 11-372336, No. Hei. 11-372338, all filed on Dec. 28, 1999 and No. 2000-35535 and No. 2000-35536 both filed on Feb. 14, 2000, the entire contents of each being hereby incorporated by reference

What is claimed is:
1. An endless belt, comprising:
  a molding in the shape of an endless belt obtained by mixing while heating a crystalline resin having at least one hydroxyl group, carboxyl group or ester linkage, an amorphous resin having at least one hydroxyl group, carboxyl group or ester linkage, conductive carbon black and a polymerization catalyst, thereby preparing a mixed resin composition; and molding said mixed resin composition.
2. An endless belt according to claim 1, which has a folding endurance of 5000 or more in the circumferential direction, a tensile strength of 1500 to 5000 Mpa in the circumferential direction, and a breaking extension of 30% or more in both the circumferential and the width directions.
3. An endless belt according to claim 1, whose tensile modulus at 40° C. is 60% or more than the tensile modulus as determined at 5° C. and whose tensile modulus at 60° C. is 20% or more than the tensile modulus as determined at 5° C.
4. An endless belt according to claim 1 which has a surface resistivity of $1 \times 10^{1}$ to $1 \times 10^{16}$ $\Omega$ or a volume resistivity of $1 \times 10^{1}$ to $1 \times 10^{16}$ $\Omega \cdot$cm, the maximum of said surface resistivity or volume resistivity being not more than 100 times the minimum.
5. An endless belt according to claim 1 which has an average thickness of 70 to 300 $\mu$m.
6. An endless belt according to claim 1 which is seamless.
7. An endless belt according to claim 1, which is a seamless belt having been melt-extruded from a ring die and set while cooling.
8. An image forming apparatus comprising the endless belt according to claim 1.

9. An endless belt according to claim 1, wherein the belt exhibits a differential scanning calorimetry curve such that the difference between the peak temperature showing the melting peak in the first temperature rise and the peak temperature showing the melting peak in the second temperature rise following cooling is 30° C. or less.

10. An endless belt according to claim 1, wherein the structure of the belt exhibits a sea-island structure.

11. An endless belt according to claim 1, wherein the molecular structure of the belt is such that the molecular chains of said crystalline resin and the molecular chains of said amorphous resin contain chemical bonds formed therebetween.

12. An endless belt according to claim 1, wherein the total weight of said crystalline resin and said amorphous resin per mole of said chemical bonds is 300,000 g or less.

13. An endless belt according to claim 1, wherein the weight ratio of said crystalline resin to said amorphous resin is 1/99 to 99/1, and said polymerization catalyst has a metal content of 1 to 10,000 ppm based on the total weight of said crystalline resin and said amorphous resin.

14. An endless belt according to claim 1, wherein the mixing ratio (X parts by weight) of said crystalline resin, the weight average molecular weight ($Mw_1$) of said crystalline resin based on polystyrene conversion, the mixing ratio (Y parts by weight) of said amorphous resin, the weight average molecular weight ($Mw_2$) of said amorphous resin based on polystyrene conversion, and the weight average molecular weight ($Mw_3$), based on polystyrene conversion, of said resin composition obtained by mixing the crystalline resin, the amorphous resin, and the polymerization catalyst while heating satisfy the following relationship:

$$Mw_3 \geq X/(X+Y) \times Mw_1 + Y/(X+Y) \times Mw_2.$$

15. An endless belt according to claim 14, wherein the weight average molecular weight ($Mw_3$) is 130,000 or more based on polystyrene conversion.

16. An endless belt according to claim 14, wherein the composition of the belt contains from 3 to 30% by weight of carbon black as an electrically conductive filler.

17. An endless belt according to claim 1, wherein the endless belt has a surface resistivity of $1 \times 10^1$ to $1 \times 10^{16}$ Ω or a volume resistivity of $1 \times 10^1$ to $1 \times 10^{16}$ Ω·cm.

18. An endless belt according to claim 1, wherein the endless belt has a surface resistivity of $1 \times 10^1$ to $1 \times 10^9$ Ω or a volume resistivity of $1 \times 10^1$ to $1 \times 10^9$ Ω·cm.

19. An endless belt according to claim 1, wherein the endless belt has a surface resistivity of $1 \times 10^1$ to $1 \times 10^9$ Ω or a volume resistivity of $1 \times 10^1$ to $1 \times 10^9$ Ω·cm.

20. An endless belt according to claim 1, wherein the endless belt has a surface resistivity of $1 \times 10^6$ to $1 \times 10^{13}$ Ω or a volume resistivity of $1 \times 10^6$ to $1 \times 10^{13}$ Ω·cm.

21. An endless belt according to claim 10, wherein the endless belt has a surface resistivity of $1 \times 10^{10}$ to $1 \times 10^{16}$ Ω or a volume resistivity of $1 \times 10^{10}$ to $1 \times 10^{16}$ Ω·cm.

* * * * *